(12) United States Patent
Biebach et al.

(10) Patent No.: US 9,815,541 B2
(45) Date of Patent: Nov. 14, 2017

(54) BOAT WITH ELECTRIC DRIVE

(71) Applicant: Torqeedo GmbH, Gilching (DE)

(72) Inventors: Jens Biebach, Tutzing (DE); Philipp Krieger, Feldafing (DE); Marc Hartmeyer, Munich (DE)

(73) Assignee: Torqeedo GmbH, Gilching (DE)

( * ) Notice: Subject to any disclaimer, the term of this patent is extended or adjusted under 35 U.S.C. 154(b) by 197 days.

(21) Appl. No.: 14/442,056

(22) PCT Filed: Nov. 11, 2013

(86) PCT No.: PCT/EP2013/003395
§ 371 (c)(1),
(2) Date: May 11, 2015

(87) PCT Pub. No.: WO2014/072074
PCT Pub. Date: May 15, 2014

(65) Prior Publication Data
US 2015/0307177 A1   Oct. 29, 2015

(30) Foreign Application Priority Data
Nov. 12, 2012  (DE) .......... 10 2012 021 996

(51) Int. Cl.
*H02J 7/00* (2006.01)
*B63J 3/04* (2006.01)
(Continued)

(52) U.S. Cl.
CPC ............. *B63J 3/04* (2013.01); *B63H 20/12* (2013.01); *B63H 21/17* (2013.01); *B63H 21/36* (2013.01);
(Continued)

(58) Field of Classification Search
CPC ........ B63H 20/12; B63H 21/17; B63H 21/36; B63H 23/24; B63J 3/04; H01H 47/00;
(Continued)

(56) References Cited

U.S. PATENT DOCUMENTS

2007/0039929 A1*  2/2007  Buhler ............... B23H 7/04
                                                  219/69.18
2010/0125383 A1    5/2010  Caouette
(Continued)

FOREIGN PATENT DOCUMENTS

CN         101920780 A       12/2010
CN         102514698 A        6/2012
(Continued)

OTHER PUBLICATIONS

Chinese Office Action issued in Chinese counterpart application No. 201380058902.4 dated Jul. 26, 2016, with English translation (Seventeen (17) pages).
(Continued)

*Primary Examiner* — Vuthe Siek
(74) *Attorney, Agent, or Firm* — Crowell & Moring LLP

(57) ABSTRACT

A method for charging an auxiliary voltage source of a boat having an electric drive that is powered by a main voltage source of the boat, the auxiliary voltage source providing power for at least one additional component, is described. A protection and/or control circuit is electrically connected to the main voltage source via a DC-to-DC converter configured for power supply, and to the auxiliary voltage source via a switch or a reverse blocking valve. The auxiliary voltage source is charged via the main voltage source.

15 Claims, 2 Drawing Sheets

(51) Int. Cl.
*B63H 23/24* (2006.01)
*B63H 21/17* (2006.01)
*B63H 21/36* (2006.01)
*H01M 2/12* (2006.01)
*H01M 10/0525* (2010.01)
*B63H 20/12* (2006.01)
*H01H 47/00* (2006.01)

(52) U.S. Cl.
CPC ............. *B63H 23/24* (2013.01); *H01H 47/00* (2013.01); *H01M 2/1223* (2013.01); *H01M 10/0525* (2013.01); *H01M 2220/20* (2013.01)

(58) Field of Classification Search
CPC ......... H01M 10/0525; H01M 2220/20; H01M 2/1223
See application file for complete search history.

(56) References Cited

U.S. PATENT DOCUMENTS

| | | | | |
|---|---|---|---|---|
| 2010/0174450 | A1* | 7/2010 | Mizushima | ................ B63J 3/02 701/36 |
| 2012/0293006 | A1* | 11/2012 | Kim | ..................... H04B 5/0031 307/104 |

FOREIGN PATENT DOCUMENTS

| | | |
|---|---|---|
| JP | 55-87699 A | 7/1980 |
| WO | WO 2011/154196 A3 | 12/2011 |
| WO | WO 2014/072070 A1 | 5/2014 |
| WO | WO 2014/072071 A1 | 5/2014 |
| WO | WO 2014/072072 A1 | 5/2014 |
| WO | WO 2014/072073 A1 | 5/2014 |

OTHER PUBLICATIONS

PCT/EP2013/003395, International Search Report dated Feb. 21, 2014 (Two (2) pages).

U.S. patent application, "Electrical Accumulator with Water Sensor", U.S. Appl. No. 14/442,047, filed May 11, 2015, First named inventor: Marc Hartmeyer et al.

U.S. patent application, "Boat with High-Voltage System", U.S. Appl. No. 14/442,051, filed May 11, 2015, First named inventor: Jens Biebach et al.

U.S. patent application, "Boat with Electric Drive", U.S. Appl. No. 14/442,058, filed May 11, 2015, First named inventor: Jens Biebach et al.

U.S. patent application, "Boat with Electric Drive and Emergency Off Switch", U.S. Appl. No. 14/442,062, filed May 11, 2015, First named inventor: Jens Biebach et al.

\* cited by examiner

BOAT WITH ELECTRIC DRIVE

This application claims the priority of International Application No. PCT/EP2013/003395, filed Nov. 11, 2013, and German Patent Document No. 10 2012 021 996.2, filed Nov. 12, 2012, the disclosures of which are expressly incorporated by reference herein.

BACKGROUND AND SUMMARY OF THE INVENTION

The invention relates to a method for charging an auxiliary voltage source found on a boat with an electric drive, which auxiliary voltage source provides power for at least one additional component, wherein a main voltage source, which provides power for the electric drive, is found on the boat.

The invention concerns a boat with electric drive with associated DC voltage source for power supply to various electric components, in particular drive components, and with a further DC voltage source for supplying power to control and monitoring components, for example.

It is often necessary to provide two separate energy stores, for example batteries, in a boat with electric drive. The necessity of using two energy stores can result, for example, from different requirements in terms of availability for the drive/power components and the control components. Components of the power circuit and components of the control circuit often have different requirements for the level of the supply voltage, with the result that energy stores with different voltages must be provided.

For this reason, a main voltage source for supplying power to the power components, for example the electric drive, in particular the electric motor, and an auxiliary voltage source for supplying power to the control components, for example, are provided on the boat. Since the power components have the higher power requirement, the energy content of the main voltage source is greater than the energy content of the auxiliary voltage source.

The problem addressed by the present invention is to propose a device and a method for charging the auxiliary voltage source of a boat.

This problem is addressed by the embodiments disclosed herein.

The boat is connected to a voltage source on land in order to charge the main voltage source. The invention enables the auxiliary voltage source to be charged from the main voltage source. The auxiliary voltage source therefore does not need to be connected to a power supply on land. Therefore, only one interface/connection point between the electrical installation on board the boat and the land needs to be produced.

In order to use the boat, the boat must be disconnected from the land connection, with the result that the charging of the main voltage source is discontinued. Once the land connection has been disconnected, it is possible according to embodiments of the invention also to charge the auxiliary voltage source from the main voltage source. Thus, a sufficient state of charge of the auxiliary voltage source and hence a reliable supply to the control components and, in particular, safety components can also be ensured during the trip.

In general on a boat, all of the safety-related components, for instance an emergency stop loop, an insulation monitor, a water monitor, a drive controller or a GPS, are connected to the auxiliary voltage source. At the same time, the additional components used for comfort, for instance cooling units, heating elements, lighting, are usually connected to the auxiliary voltage source. There exists the danger that the auxiliary voltage source is loaded so heavily and discharged so much by said additional electrical consumers that the energy content of said auxiliary voltage source decreases to a value which is no longer sufficient to supply the safety components with power.

The safety components are used, for example, to switch the connection terminals of a high-voltage source to be isolated from the supply in the event of problems. Thus, for example, in the event of a failure of a safety component, the electrical connection between the cells of the main voltage source and the connection terminals of the main voltage source can be interrupted, with the result that the electric drive connected to the connection terminals is no longer supplied with power, although the main voltage source still has a sufficient energy content. The boat becomes no longer maneuverable, as a result of which a situation which is dangerous for the crew of the boat can arise. According to embodiments of the invention, the possibility then exists to charge the auxiliary voltage source on board the boat from the main voltage source.

In a boat with a high-power electric drive, the electric drive is often designed as a high-voltage system in order to maintain the power level in the drive system in a controllable manner. The control, monitoring and safety devices with which the electric drive is controlled, monitored and made safe are not power components, however, and are therefore often designed as low-voltage systems. In an embodiment of the invention, therefore, a high-voltage source is provided as main voltage source and a low-voltage source is provided as auxiliary voltage source.

In particular, voltage sources with a terminal voltage of more than 60 volts, more than 100 volts or more than 200 volts should be referred to as high-voltage sources. A low-voltage source should preferably have a terminal voltage of at most 48 volts, at most 24 volts or at most 12 volts.

According to embodiments of the invention, the auxiliary voltage source, in particular a low-voltage source, is charged from the main voltage source, in particular a high-voltage source. For this purpose, an auxiliary charging device for the auxiliary voltage source is provided, which auxiliary charging device is connected to the main voltage source and which charges the auxiliary voltage source from the main voltage source. Thus, for example, in the case of a main voltage source designed as a high-voltage source and an auxiliary voltage source designed as a low-voltage source, the auxiliary charging device is provided with a DC-to-DC converter by means of which the higher voltage of the high-voltage source can be transformed into the lower voltage level of the auxiliary voltage source.

The main voltage source is used for supplying power to the electric drive, in particular to an electric motor. The electric drive has a significantly higher power than the auxiliary units which are connected to the auxiliary voltage source. Correspondingly, the main voltage source has a significantly higher energy content than the auxiliary voltage source. The main charging device for charging the main voltage source correspondingly likewise has a significantly higher power than a charging device for charging the auxiliary voltage source. Preferably, the main charging device is configured such that it can simultaneously charge the main voltage source and the auxiliary voltage source connected to the main voltage source in a predefined time period. Since, for this purpose, the main charging device only needs to apply slightly more power in comparison to charging the main voltage source alone, the main charging device can be designed with a low extra capacity such that it can additionally supply the auxiliary voltage source.

Both the main voltage source and the auxiliary voltage source are preferably designed as rechargeable batteries. The embodiments described herein can be used in the case of batteries with any desired cell chemistry. Preferably, lithium batteries, lithium-ion batteries, lithium-manganese batteries or lithium-manganese-cobalt batteries are used as voltage sources, as main and/or auxiliary voltage source.

High-voltage sources often have their own control device. Said control device is often supplied by a low-voltage source. For the user's safety, for example, a control device can be provided which ensures that the high-voltage source can switch its voltage at its connection terminals only if said control device is supplied by a low-voltage source. That is to say that the low-voltage source must already be available before the start of the charging of the high-voltage source.

Preferably, a low-voltage source is provided which has an energy content that is sufficiently large that it still enables the connection of the high-voltage source after a usual time period in the event of a discharge, which is to be taken into account, by additional components and further consumers and in the case of assumed self-discharge. Preferably, the low-voltage source has a charge of at least 30 Ah, preferably at least 40 Ah. In the case of a sport boat, a battery suitable for this would have, for example, at least 44 Ah.

After the high-voltage source is connected, the low-voltage source can be charged from the high-voltage source. At the same time, however, the high-voltage source can also be charged by means of a main charging device. The main charging device for the high-voltage source should therefore have a power which is suitable for simultaneously charging the high-voltage and low-voltage sources.

The main voltage source can be charged by a main charging device which is found on the boat or on land. If the main charging device is found on land, a DC voltage connection between the land and the boat is necessary. If the charging device for the main voltage source is found on the boat, an AC voltage connection between the land and the boat is necessary.

Since the auxiliary voltage source can also be used to supply additional components, an electrical decoupling of the power supply of the additional components and the power supply of the system and safety-related components is advantageous.

This is achieved, for example, by the power supply of the additional components and the power supply of the safety-related components being decoupled from one another by means of a switch or a reverse-blocking valve, for instance by means of a diode, with the result that a drop in the power supply of the additional components does not disrupt the power supply of the safety-related components.

The auxiliary voltage source is preferably used as power supply for the additional components and the safety-related components are advantageously supplied with power via a DC-to-DC converter from the main voltage source. The power supply via the auxiliary voltage source ensures that the additional components are reliably supplied even in the event of a pulse-shaped power demand. The operation of an auxiliary motor for trimming and/or tilting of an outboard motor is a typical pulse load which must be buffered by the auxiliary voltage source.

If a temporary overloading of the auxiliary voltage source were to occur, the operation of the safety-related components would not be impaired since said components have their own power supply and are decoupled from the auxiliary voltage source by a switch or a reverse-blocking valve.

In particular, a diode can be used as reverse-blocking valve. In order to reduce the forward losses, the diode can be replaced by an inversely driven MOSFET, the channel of which is additionally switched on when current flows via the inverse diode.

Provided the main voltage source is not yet connected, in particular when the voltage is not yet present across the connection terminals of the main voltage source, the safety-related components cannot be supplied via the DC-to-DC converter from the main voltage source, either. In this case, the power supply of the safety-related components takes place via the reverse-blocking valve which allows current to flow only in the direction from the auxiliary voltage source to the safety-related components and not vice versa. That means that, before the main voltage source is switched on, the safety-related components are supplied from the auxiliary voltage source via a switch or a reverse-blocking valve. Since the main voltage source is often safeguarded by a safety-related component, for example a protection and control circuit, and can only be switched on when the respective safety-related component enables the switch-on, it is ensured that the main voltage source can be switched on and, after the switch-on, the power supply of the safety-related components takes place via the DC-to-DC converter.

The method according to embodiments of the invention for charging the auxiliary voltage source allows the charging of main voltage source and the auxiliary voltage source at different times. The auxiliary voltage source can be charged independently of the charging of the main voltage source. In particular, the auxiliary voltage source can also be charged when the boat has not berthed on land.

The invention and further details of the invention are explained in more detail in the following exemplary embodiments.

DETAILED DESCRIPTION OF THE DRAWINGS

Figure 1:
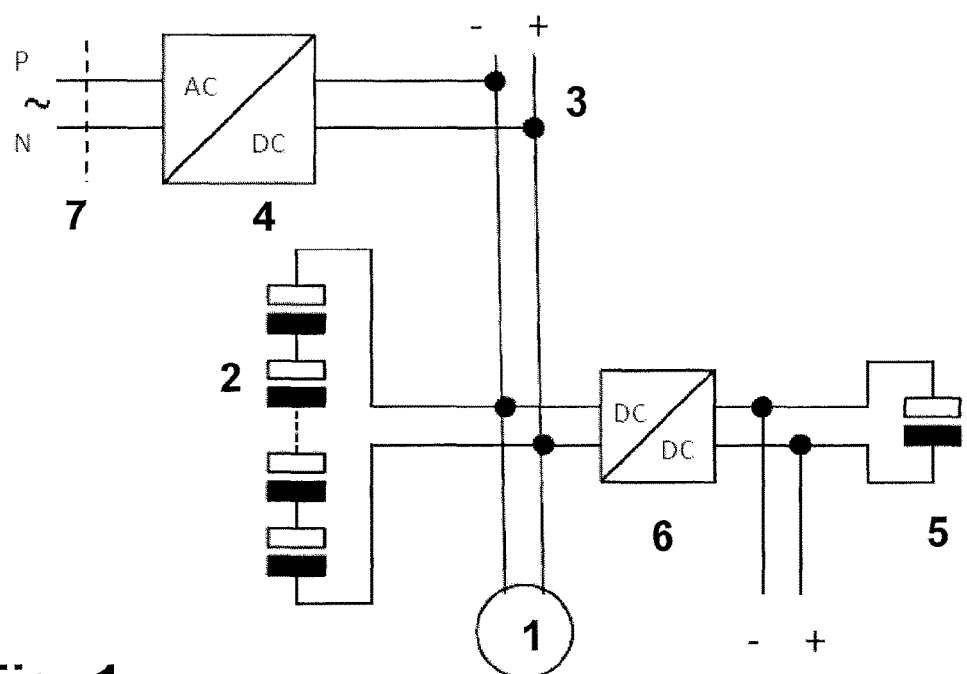
FIG. 1 shows a power supply according to embodiments of the invention on a boat.

A boat with an electric drive 1 has a high-voltage source 2 to which the electric drive 1 is connected. The high-voltage source 2 is a rechargeable lithium-ion battery which has a maximum charge of, for example, 80 Ah, 100 Ah, 150 Ah or 200 Ah and a nominal voltage of more than 200 V, for example 300 V, 350 V or 400 V. Further power consumers may likewise be connected to the supply line 3 which is connected to the high-voltage source 2.

The high-voltage source 2 can be charged via a main charging device 4 found on the boat and connected to the supply line 3. In order to charge the high-voltage source 2, the main charging device 4 is connected to a power supply which is not illustrated in the figure and which is located outside of the boat, for example on land. The interface between the electrical systems on the boat and those on land is marked by the reference sign 7.

A low-voltage source 5 is also provided on the boat, said low-voltage source having a terminal voltage of, for example, 12 V, 24 V or 48 V. Several electrical components which are used for the comfort of the boat's crew and safety-related components, such as control devices, a navigation system and, in particular, a safety circuit which connects the high-voltage source 2 to the supply line 3 or disconnects it therefrom, are connected to the low-voltage source 5.

According to embodiments of the invention, an auxiliary charging device 6 is provided on board and connected to the supply line 3. The auxiliary charging device 6 comprises a DC-to-DC converter and enables the charging of the low-voltage source 5 from the high-voltage source 2.

Figure 2:
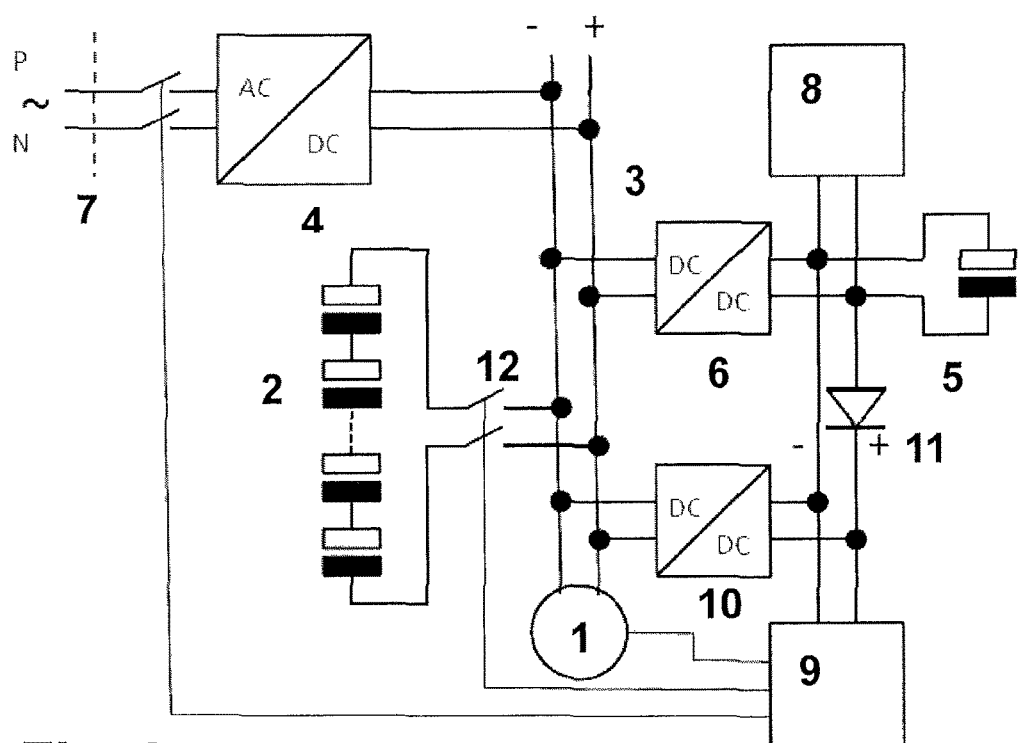
FIG. 2 shows a further embodiment.

FIG. 2 shows another embodiment of the circuit according to the invention. Identical components in the two figures are provided with identical reference signs.

The circuit composed of electric motor 1, high-voltage source 2, main charging device 4, low-voltage source 5 and auxiliary charging device 6 corresponds to the circuit according to FIG. 1.

Additional components 8, for instance lighting or consumer electronics, and safety-related components 9 are connected to the low-voltage source 5. In FIG. 2, by way of example, a safety circuit is provided for a safety-related component 9, which safety circuit opens the switch 12 if necessary and thus switches the connection terminals of the high-voltage source 2 to be isolated from the supply.

The additional components 8 are directly connected to the low-voltage source 5 and are supplied with power therefrom. According to embodiments of the invention, an auxiliary charging device 6 is provided on board and is connected to the supply line 3. The auxiliary charging device 6 comprises a DC-to-DC converter and enables the charging of the low-voltage source 5 from the high-voltage source 2.

In the embodiment according to FIG. 2, the low-voltage source 5 is also used to supply the additional components 9. In this case, it is expedient to provide an electrical decoupling of the power supply of the additional components and the power supply of the system components and safety-related components.

The safety-related components 9 are supplied with power via a further DC-to-DC converter 10, which is connected to the supply line 3.

A reverse-blocking valve 11, for example a diode, is used for electrical decoupling. A DC-to-DC converter 10 is used for the electrical power supply of the safety-related components, which DC-to-DC converter provides the low voltage for the safety-related components from the high-voltage source 2.

The safety-related components 9 are hence decoupled from the rest of the additional components 8 and supplied in a manner decoupled from the low-voltage source 5. If a temporary overloading of the low-voltage source 5 by connected additional components 8 were to occur, the operation of the safety-related controllers 9 would not be impaired since said controllers 9 have their own supply 10 and are decoupled from the low-voltage source 5 by the reverse-blocking valve 11.

In the simplest case, the reverse-blocking valve 11 can be a diode. In order to reduce the forward losses, the diode can be replaced by an inversely driven MOSFET, the channel of which is additionally switched on when current flows via the inverse diode.

A reliable supply to the additional components 8 with pulse-shaped power demands is ensured by the connection of the primary low-voltage circuit to the low-voltage source 5. The operation of an auxiliary motor for trimming and/or tilting of an outboard motor is a typical pulse load of this type, which must be buffered by the low-voltage source 5.

The invention claimed is:

1. A method for charging an auxiliary voltage source of a boat having an electric drive that is powered by a main voltage source of the boat, the auxiliary voltage source providing power for at least one additional component, the method comprising:
   electrically connecting a protection and/or control circuit to the main voltage source via a DC-to-DC converter configured for power supply, and to the auxiliary voltage source via a reverse blocking valve;
   electrically connecting the main voltage source to the auxiliary voltage source via a charging device; and
   charging the auxiliary voltage source via the main voltage source.

2. The method of claim 1, wherein the main voltage source has a terminal voltage of more than 60 V, and the auxiliary voltage source has a terminal voltage of at most 48 V.

3. The method of claim 1, further comprising charging the main voltage source and the auxiliary voltage source at different times.

4. The method of claim 1, the method further comprising: supplying, via the auxiliary voltage source, a current to the protection and/or control circuit, and to the charging device.

5. The method of claim 1, wherein the auxiliary voltage source is a low-voltage source that has a charge of at least 30 Ah.

6. The method of claim 1, wherein the reverse-blocking valve comprises a diode.

7. The method of claim 1, wherein the reverse-blocking valve comprises a MOSFET driven in the inverse direction.

8. The method of claim 1, wherein the reverse-blocking valve comprises a MOSFET based circuit in which the MOSFET channel is switched on in the conducting state such that forward losses are reduced.

9. An electrical system for a boat, the system comprising:
   a main voltage source that is electrically connectable to an electric drive so as to provide power to the electric drive;
   an auxiliary voltage source that is electrically connected to and powers at least one additional component of the boat;
   a charging device electrically connecting the main voltage source to the auxiliary voltage source, wherein the auxiliary voltage source is configured to be charged by the main voltage source via the charging device; and
   a control circuit that is electrically connected to the main voltage source via a DC-to-DC converter, and to the auxiliary voltage source via a reverse blocking valve, the control circuit being operable to electrically connect and disconnect the main voltage source from at least the electric drive.

10. The system of claim 9, wherein the main voltage source and the auxiliary voltage source are configured to be charged at different times.

11. The system of claim 9, wherein the auxiliary voltage source is configured to supply a current to the control circuit, and to the charging device.

12. The system of claim 9, wherein the auxiliary voltage source is a low-voltage source that has a charge of at least 30 Ah.

13. The system of claim 9, wherein the reverse-blocking valve comprises a diode.

14. The system of claim 9, wherein the reverse-blocking valve comprises a MOSFET driven in the inverse direction.

15. The system of claim 9, wherein the reverse-blocking valve comprises a MOSFET based circuit in which the MOSFET channel is switched on in the conducting state such that forward losses are reduced.

\* \* \* \* \*